United States Patent
Ingham et al.

(10) Patent No.: US 9,079,522 B2
(45) Date of Patent: Jul. 14, 2015

(54) DOLLY FOR MOVING TALL LOADS THROUGH THRESHOLDS WITH LOW CLEARANCE

(71) Applicants: Bradley S. Ingham, Oklahoma City, OK (US); Wesley G. Ingham, Del City, OK (US); Gary Glennwood Ingham, Moore, OK (US); Gary Gregory Ingham, El Reno, OK (US)

(72) Inventors: Bradley S. Ingham, Oklahoma City, OK (US); Wesley G. Ingham, Del City, OK (US); Gary Glennwood Ingham, Moore, OK (US); Gary Gregory Ingham, El Reno, OK (US)

( * ) Notice: Subject to any disclaimer, the term of this patent is extended or adjusted under 35 U.S.C. 154(b) by 22 days.

(21) Appl. No.: 14/044,680

(22) Filed: Oct. 2, 2013

(65) Prior Publication Data
US 2015/0091260 A1 Apr. 2, 2015

(51) Int. Cl.
*B62B 1/10* (2006.01)
*B60P 3/00* (2006.01)
*F16B 17/00* (2006.01)

(52) U.S. Cl.
CPC .. *B60P 3/00* (2013.01); *F16B 17/00* (2013.01)

(58) Field of Classification Search
USPC .......... 280/35, 47.34, 651, 79.11, 79.2, 79.7; 414/460, 461
See application file for complete search history.

(56) References Cited

U.S. PATENT DOCUMENTS

| | | | |
|---|---|---|---|
| 1,609,625 A | 12/1926 | Lawes | |
| 1,952,238 A | 3/1934 | Dice | |
| 2,028,442 A | 1/1936 | Dormer | |
| 2,039,464 A | 5/1936 | Troup | |
| 2,205,057 A | 6/1940 | Brady | |
| 2,262,937 A | 11/1941 | Holmes | |
| 2,296,611 A | 9/1942 | Green | |
| 2,444,690 A | 7/1948 | Almendinger | |
| 2,528,672 A | 11/1950 | Sullivan | |
| 2,562,189 A | 7/1951 | Harris | |
| 2,655,713 A | 10/1953 | Chrisman | |
| 2,669,013 A | 2/1954 | Wilson | |
| 2,835,956 A | 5/1958 | Moore | |
| 2,913,132 A | 11/1959 | Cluck | |
| 3,494,492 A | 2/1970 | Theirman | |
| 3,973,754 A | 8/1976 | Chadwick | |
| 4,861,219 A * | 8/1989 | Mayle | 414/469 |
| 5,580,073 A | 12/1996 | Irwin | |
| 6,415,558 B1 | 7/2002 | Cherry | |
| 6,419,440 B1 | 7/2002 | Smith | |
| 7,213,820 B2 * | 5/2007 | Drummond | 280/79.11 |
| 7,237,362 B2 | 7/2007 | Bishop | |
| 7,428,800 B1 | 9/2008 | Vaughn | |
| 8,038,193 B2 | 10/2011 | Rasmussen | |
| 2012/0222367 A1 | 9/2012 | Wirtz | |

OTHER PUBLICATIONS

Houzz; "Storm Shelter Garage Installation"; retrieved on Aug. 16, 2013 from http://www.houzz.com/photos/2415055/Storm-Shelter-Garage-Installation---nashville.

* cited by examiner

*Primary Examiner* — John Walters
(74) *Attorney, Agent, or Firm* — Robert H. Frantz (57) ABSTRACT

A shallow-draft dolly for moving a pre-fabricated storm shelter or other load throw threshold with minimal clearance. In one embodiment, the dolly has two side rail units, each with a lower and an upper bar; four wheel arms with attached wheels extending from the ends of the side rails, at least two of which are pivotally attached; front and rear cross members disposed between the ends of the side rail units; and two or more intermediate cross members transversing between the lower bars, thereby providing a slatted load bed positioned at or below the axles of the wheels, and wherein the front cross member is removable such that a load may be moved over an open pit with the wheels astride the pit, the load lifted from the bed, the front cross member removed, and the dolly rolled from underneath the load thereby leaving the load suspended over the pit.

12 Claims, 5 Drawing Sheets

DOLLY FOR MOVING TALL LOADS THROUGH THRESHOLDS WITH LOW CLEARANCE

CROSS-REFERENCE TO RELATED APPLICATIONS

Claiming Benefit Under 35 U.S.C. 120

None.

FEDERALLY SPONSORED RESEARCH AND DEVELOPMENT STATEMENT

None.

MICROFICHE APPENDIX

Not applicable.

INCORPORATION BY REFERENCE

None.

FIELD OF THE INVENTION

The present invention relates to load handling equipment, and especially to equipment and methods for moving a tall pre-fabricated item into a building through a threshold which has little or no clearance relative to the height of the item.

BACKGROUND OF INVENTION

Storm shelters, safe rooms, equipment cabinets, large appliances, and many other items intended for use inside a building or home often are constrained in their size due to limitations in the dimensions of the thresholds of such buildings. These items are often pre-fabricated to fit through a "standard" size door, and often their dimensions allow for very little clearance as they pass through a building threshold.

Some pre-fabricated items, such as large built-in appliances (e.g. refrigerators, etc.) and large plumbing fixtures (e.g. whirlpool tubs, shower enclosures, garden tubs, etc.) are only installable during "new construction" before the walls are finished. Since they are one of the first items installed, they are then subject to possible damage during the rest of construction. To remove or replace such "new construction" installed items after the completion of the building or home, often structural damage is incurred such as removing a window or opening up a wall.

Other pre-fabricated items are intended for installation in "existing structures", i.e., structures which are finished. These items must be sized appropriately to pass through the thresholds available in the structure. In order to provide the very largest possible item, such as the largest available bath tub, shower enclosure, refrigerator, piece of furniture, etc., they are often constructed of dimensions which allow very minimal clearance through standard size thresholds.

Handling such large items when threshold clearance is minimal, whether during new construction or post-construction installation, can be very challenging. If the item is not properly handled, damage can occur to the item, to the building details (doors, trim work, etc.), and it can be dangerous to the handlers for potential tip-overs, finger pinches or toe drops.

SUMMARY OF THE INVENTION

Embodiments of the present invention provide a shallow-draft dolly for moving a pre-fabricated load which is slightly shorter than a threshold. In one embodiment, the dolly has two side rail units, each with a lower bar and an upper bar; four wheel arms with attached wheels extending from the ends of the side rail units, at least two of which are pivotally attached; front and rear cross members disposed between the ends of the side rail units; and two or more intermediate cross members transversing between the lower bars, thereby providing a slatted load bed positioned at or below the axles of the wheels, and wherein the front cross member is removable such that a load may be moved over an open pit with the wheels astride the pit, the load lifted from the bed, the front cross member removed, and the dolly rolled from underneath the load thereby leaving the load suspended over the pit.

BRIEF DESCRIPTION OF THE DRAWINGS

The figures presented herein, when considered in light of this description, form a complete disclosure of one or more embodiments of the invention, wherein like reference numbers in the figures represent similar or same elements or steps.

DETAILED DESCRIPTION OF EMBODIMENT(S) OF THE INVENTION

The present inventors have recognized a problem in the art which is currently unrecognized and unsolved. While solving one particular species of problem related to the handling and installation of a large pre-fabricated product into pre-existing homes, the present inventors have developed a load handling dolly which may have equally useful application to other types of large items which have dimensions with minimal clearance through building thresholds.

So-called "in-ground" storm shelters are provided in two general formats: those which are installed outside the home or building, and those which are install inside the home or building. Inside-installed shelters can be installed in a room in a home or office, typically during construction, or in an accessible area of the home such as in a garage.

The invention described in the following paragraphs was developed to satisfy a need in the industry for installing pre-fabricated steel in-ground storm shelters into existing home garages. As will be evident, however, from the disclosure, the inventive handling dolly may also be very useful for installations of shelters during construction, as well as handling of many other items post-construction, such as large appliances, large furniture, safe rooms, valuables safes, equipment cabinets, holding tanks (water, aquariums, liquefied propane gas, other gas, etc.), tubs, shower enclosures, especially for situations where the dimensions of the item and the dimensions of the threshold through which the item must pass provides extremely small amounts of clearance.

As such, there are many manners of usage of the present invention. The following disclosure will set forth a number of embodiments of the present invention than their methods of use for installing in-ground storm shelters. Those skilled in the art will recognize that these are illustrative embodiments and illustrative methods of use. Those skilled in the art will recognize many other embodiment variations and methods of use which will fit with in the spirit and scope of the present invention.

In-Ground Garage Shelter Installation Overview

Installation as Done Today.

Some time prior to installation of an in-ground storm shelter in a residential garage, a rectangular opening in the concrete foundation of the residence is formed (during construction) or cut (after construction), and then the dirt below the rectangular opening is excavated to form a pit suitable in width, length and depth to receive the pre-fabricated shelter unit.

Most in-ground shelters which are installed in homes are fabricated out of steel, coated to resist corrosion, and provided with certain interior features to accept steps, benches, etc., a factory. Then, they are loaded by lift onto a flatbed truck, and delivered to a home or business for installation.

At the installation site, especially at a finished home (post-construction), a lift such as a backhoe is used to remove the shelter from the flatbed truck, and place it onto a surface such as a driveway. Often, the backhoe used to take the shelter off the trailer is the same backhoe used to excavate the pit.

One should bear in mind that most garage doors (e.g. the threshold in general) of an existing home have a 7' clearance from ground to the top of the door opening. It is generally undesirable to tear back the threshold to provide greater clearance, so it is necessary to lift the shelter with the scoop or bucket arm of the backhoe and place in over the pit. This is typically done by hooking the bucked into the walk-down entrance on top of the shelter while it is sitting outside the garage. Then, the backhoe operator uses the backhoe arm to lift the shelter off the ground, and to move it into the garage, with the machinery of the backhoe arm protruding and extending from the top of the shelter.

Because of this machinery arrangement, and because of the 7' clearance to the top of the garage door, most pre-fabricated shelters are limited in height to 5 or 5.5'. This leaves about 1' for the height of the backhoe arm, and roughly 0.5' (six inches) clearance from the ground to the bottom of the shelter. The inside height (e.g. "standing room" for occupants) of the shelter will be a few inches less that the outside height due to the thickness of the shelter material and reinforcing bars, etc.

Also bear in mind that most garage floors are raised above the driveway level by an inch or two, in order to provide a barrier from leaves, water, and silt from entering the garage from outside, and in order to promote heavier-than-air gases and fumes from the garage to "fall out" of the garage and not to re-enter. This "step up height" may be set by local building codes, including a second step up height from the garage into the home, such as into a mud room, utility room or kitchen. This further reduces the clearance for the threshold, and further drives the common pre-fabricated shelter to be limited in height Upon the leading edge (front) of the shelter nearing the garage threshold, usually the operator of the forklift or backhoe must work with a spotter who stands in a position to see the clearance of the shelter with the top of the threshold, and also to monitor the clearance with the stepped-up garage floor to the bottom of the shelter. Meticulously, the operator and spotter will adjust the backhoe arm height to just barely position the shelter into the garage, positioned above the pit.

The pit can be dangerously deep, such as 6' to 7' feet deep, and just 4' to 5' wide. This becomes a hazard to the installation crew until the shelter is lowered into place. A crew member falling into the pit not only may be injured upon reaching the bottom of the pit, but may also be injured initially in the fall by striking a head or body member on an edge of the top of the pit (e.g. the cut edge of the concrete).

Now, the shelter must be maneuvered and lowered into the pit, and checked for proper plumb and level positioning. If it is not plumb or level, then it must be lifted back up and out of the pit, and a member of the installation crew may have to enter the pit to make adjustments with a shovel to the walls or floor of the pit. This is a particularly dangerous time during installation because the pit walls are not retained and the shelter may be hanging above the crew member, both of which pose an injury danger. This process is repeated until the shelter is plumb and level, followed by backfilling dirt or concrete around the shelter and completing the top opening of the pit (e.g. pouring concrete from the edge of the opening to the upper edges of the shelter or placing a finish trim ring or trim pieces around the top of the shelter).

Clearly, this is a process fraught with undesirable danger and with possible unwanted damage to the home, building, and the shelter. Further, this process, except for the pit creation, is similar to the difficulties of installing other large and cumbersome to handle pre-fabricated items into buildings through thresholds having minimal clearance.

Discovery of an Unrecognized Problem

While the foregoing difficulties are well known in the art but are tolerated for lack of a better solution and because many construction activities are similarly dangerous, the present inventors have recognized an additional problem inherent to this process which is not yet recognized in the art. Because of these existing "standard" dimensions of garage doors and these common installation procedures, the height of pre-fabricated in-ground storm shelters is limited to roughly 5.5' or less. This can become something of a sales challenge when competing against other storm shelter solutions, such as above-ground safe rooms and larger, taller outside in-ground storm shelters, both of which may provide a 6' inside clearance for more comfortable occupation by taller persons. Such shelters with taller inside clearance also tend to evoke less claustrophobia, which is a general challenge to selling any type of storm shelter or safe room.

In the process of developing the new handling dolly disclosed herein, the present inventors have recognized an unexpected advantage that embodiments of the invention allow easy and safe installation of pre-fabricated shelters which have heights much closer to the maximum height of the threshold through which they must be passed, and the dolly avoids the damaging sliding of the shelter on a garage floor, and further the dolly allows safer extraction of the shelter from the pit for adjustments to the pit.

Further, in preferred embodiments of the invention, the dolly breaks down easily for convenient transportation in a pickup truck, assembles quickly and easily without tools, and employs a high degree of common components which allows the dolly to be constructed with little or no expertise or training, allows less expensive manufacturing, and allows for common spare parts.

Such embodiments of the invention, therefore, not only improve the installation process by making it safer and less damaging, but also allow for heights of such shelters to be fabricated of 6' to 6'3", even for installation through 7' garage doors, thereby enhancing the marketability of the unit by providing greater inside "head room". And, because the inside head room is more comfortable and less likely to evoke claustrophobia, the taller shelter is actually safer because owners are more likely to enter the unit during storms at an earlier time, and to stay in them longer, thereby extending the period of protection for the owners.

These and other advantages of the embodiments of the present invention will be apparent in the following paragraphs.

Exemplary Embodiment

Figure 1:
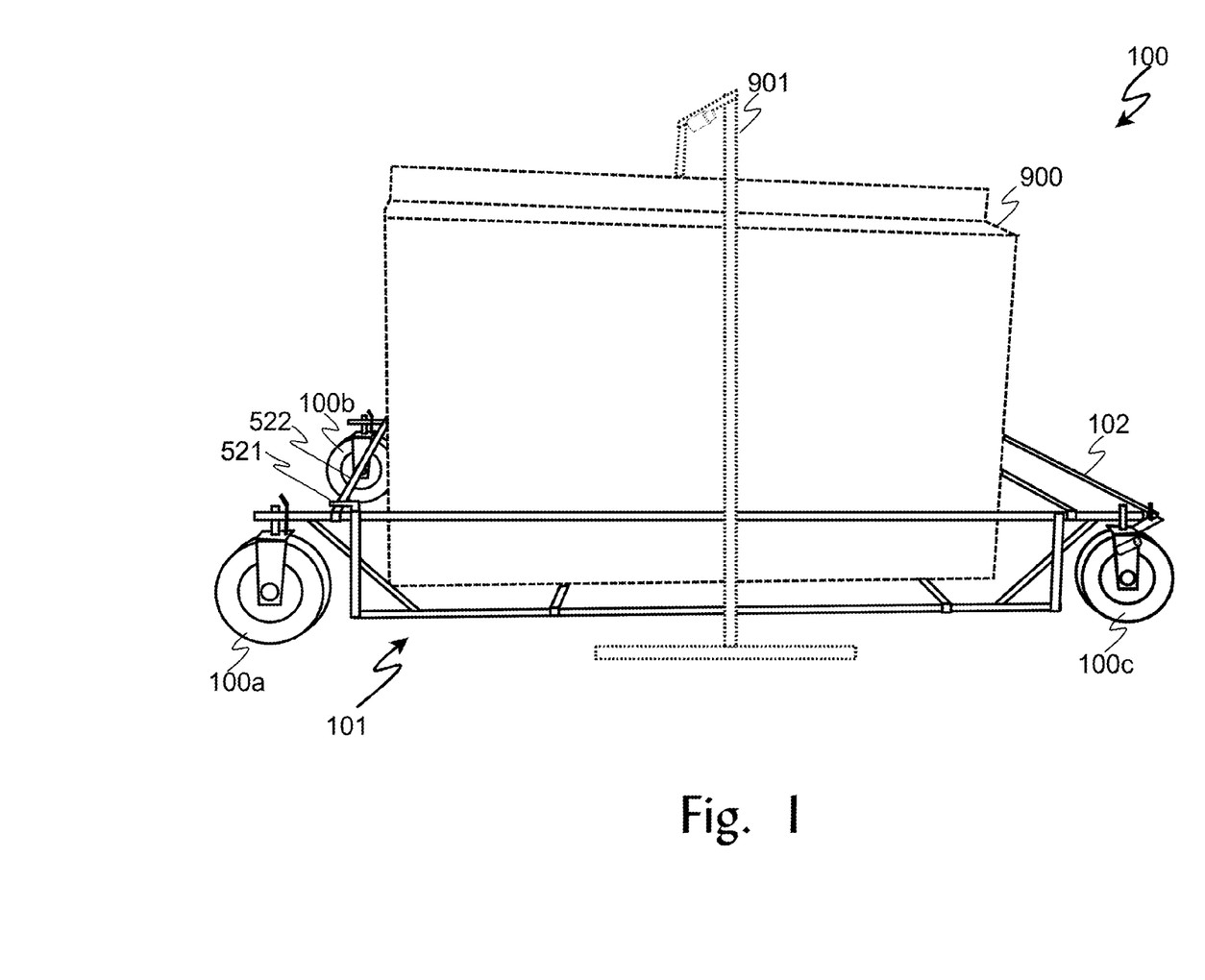
FIG. 1 provides a side view in schematic format of a dolly according to the present invention carrying a load such as a pre-fabricated in-ground storm shelter.

Referring now to FIG. 1a, a schematic side view of an exemplary shallow-draft dolly embodiment (100) according to the invention is shown. We are using the term "draft" similarly to how the term is used in reference to the position of a ship in the water, wherein a ship's draft refers to the minimum depth of water for it to safely navigate such that the bottom-most point of the ship's hull clears the seabed. In the present context, the shallow-draft dolly provides for a minimal clearance between the bottom-most portion of the dolly or shelter it bears and the surface on which it is rolling. By schematic, we are referring to a simplified format of a mechanical diagram that shows the arrangement and organization of major components, but is not necessarily showing full details such as the thickness or shape of the metal stock used to fabricate the components.

This exemplary unit provides for four pivoting caster wheels: a rear-right wheel (100a), a rear-left wheel (100b), a front-right wheel (100c), and a front-left wheel (hidden in this view). Running lengthwise from front-to-back of the dolly is a right-side rail member (101) which is flanked in parallel by a left-side rail member (hidden in this view), a front cross member, a rear cross members, and one or more intermediate cross members. In this particular view, an example shelter (900) is being carried by the dolly (100), and an arched lift (901) is shown straddling (but not attached) the dolly and over the shelter (900). Optional rear cross bar (502) lift capture hook (501) is visible in this view, as well.

Figure 2:
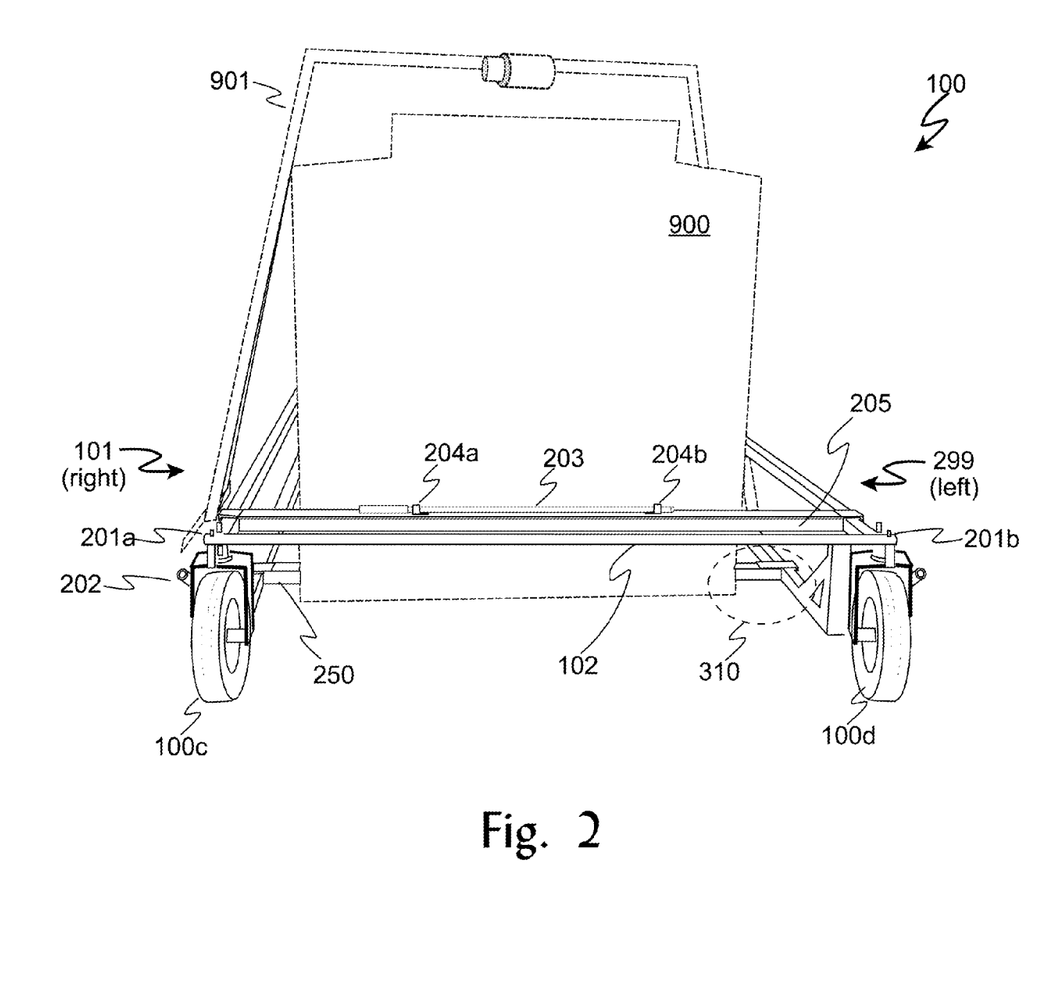
FIG. 2 provides a front view of a dolly according to the present invention carrying a load such as a pre-fabricated in-ground storm shelter.

Turning now to FIG. 2, a front view of the shallow-draft dolly (100) is shown, including the front-right wheel (100c) and the front-left wheel (100d). In this view, the front cross member (205) is visible extending from the right-side rail member (101) and the left-side rail member (299). At this point it is worth noting that the actual structures of the right-side and left-side rail members are identical and interchangeable in this embodiment, details of which will be provided in the following paragraph. By employing identical, interchangeable side rail members, assembly is made quicker and easier, manufacturing costs are reduced, and spare units are more readily supplied.

On the front cross member (205) there are provided two clips (204a, 204b) in which a steering rod (203) is removably stored. The steering rod (203) may be removed and inserted into the steering handle receiver (202) which is affixed to the saddle portion of either (or both) of the front wheels. Optionally for universality and bi-directionality of the components, the steering handle receiver may be provided on the "rear" wheels, as well, to be discussed in the following paragraphs in greater detail. Also shown in this embodiment is a steering tie rod (102) which pivotally connects the saddles of two wheels to allow the direction or aim of the wheels to be controlled together by just one steering handle. In the tool-free-assembly embodiment, the steering tie rod is received on each of its two ends onto steering pins (201a, 201b), details of which will be provided in the following paragraphs.

This particular view allows better understanding of how the arched lift (901) straddles, but does not attach to, the dolly (100) and the load that it bears (900). Also highly visible in this view is the front intermediate cross member (250) upon which the load (900) rests, which extends from the left-side rail member to the right-side rail member. In this exemplary embodiment, the two low-slung hangers (310) are provided at the distal ends of the front intermediate cross member (250), which hook over the lower frame longitudinal members of the side rails (101, 299), and which allow the main portion of the intermediate cross member to hang at the same level or lower than the bottom bars of the side rails, thereby providing a very low to the ground support position for the load (900). This provides the "shallow draft" feature of the dolly so that the load can be passed with minimal clearance on the top through a threshold in which the bottom of the load is at or below the level of the axels of the wheels. Also, such hangers can be identical in shape, allowing for the intermediate cross member to be installed during assembly of the dolly in either direction (right to left or left to right). And, one or more additional intermediate hangers of identical, interchangeable construction can be provided to in order to provide a series of slats between the bottom bars of the side rails to support the load.

Figure 3:
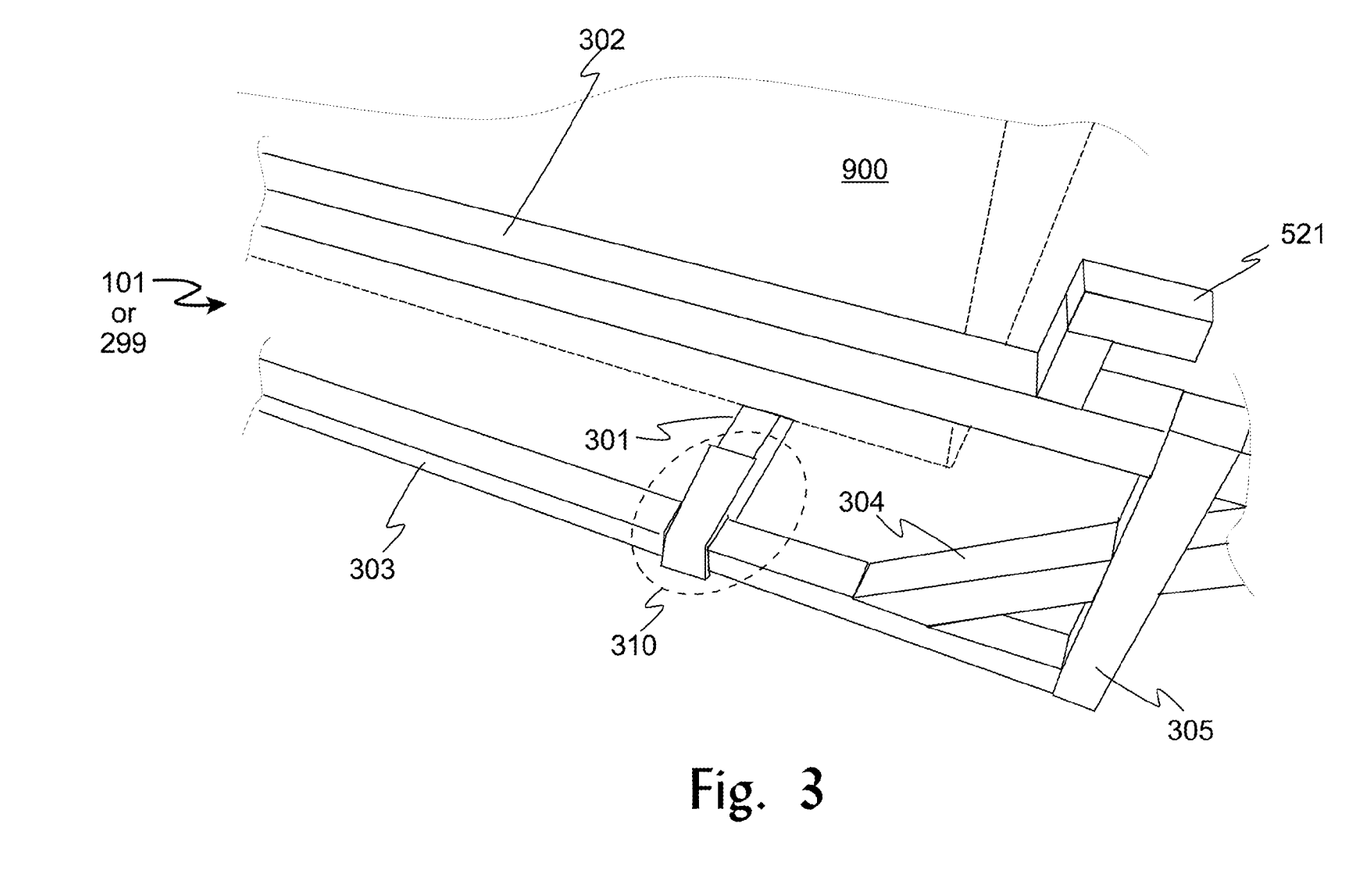
FIG. 3 illustrates details of the arrangement of components that comprise a side rail and cross member clip of at least one embodiment of the present invention.

FIG. 3 provides more details of the low-slung hanger clips (310) as well as other construction details of the side rails. In this embodiment, the side rail is composed of at least an upper frame longitudinal member (302) and a lower frame longitudinal member (303). And a vertical member (305) is attached to the longitudinal members, and may be further reinforced by a diagonal member (304). To promote lower cost of manufacturing and the reversibility of the side rails, the front of the side rails may be constructed with the same structure as the back of the side rails, thus rendering them useful in an assembly of either direction or orientation. The hanger clips (310) may be construction of an L-shaped piece of suitably strong metal, which is welded, bolted, or otherwise affixed to the end of the intermediate cross member (301) in a matter that provides a gap between the distal end of the L-shaped portion and the end of the intermediate cross member (301) of a dimension suitable for receiving the lower frame longitudinal member (303) across its width, thereby capturing the lower frame longitudinal member (303) in its gap and providing mechanical detent for the two components moving away from perpendicular relationship to each other. In some embodiments, a simple gravity fit holds the intermediate frame longitudinal member in place, aided by the weight of the load pressing down upon the cross member (301). In other embodiments, additional means of securing the clip, such as a bolt or pin, may be employed.

Also shown in FIG. 3 is a lifting hook (501) which is formed on the top of each upper frame longitudinal member (302) (or on the wheel extension arm), below which the front or rear cross member is attached to the upper frame longitudinal member using a similar low-slung hanger. The lifting hook provides a retention means for a scenario in which, when the loaded dolly is being rolled into a garage, the bottom of the cart or of the load may "high center" or drag on the garage floor. More details are given of this embodiment option in the following paragraphs.

Figure 4:
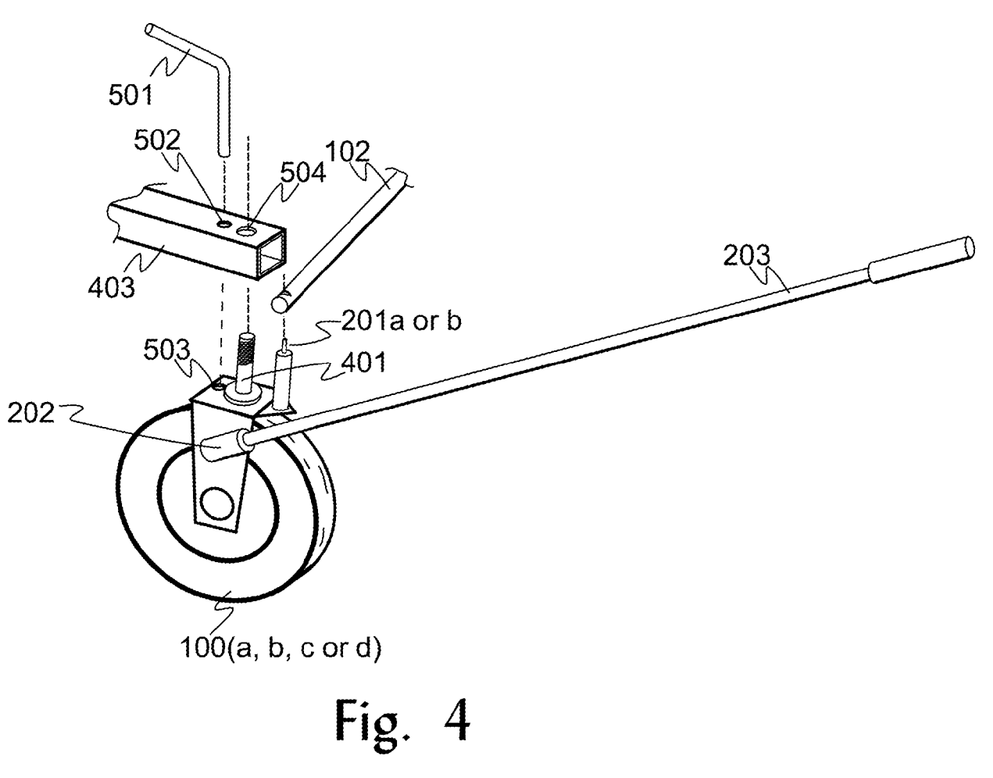
FIG. 4 depicts details of a universal, interchangeable front/rear wheel assembly of at least one embodiment of the present invention, including an optional directional rolling locking mechanism, and an optional steering mechanism.

Turning to FIG. 4, additional details of a universal or interchangeable wheel (100a, b, c, or d) and frame arm (403) are shown in an exploded view. It should be recognized that the dolly can be rolled in any direction, and that it might be steered from in front of the load or from behind the load. So, the terms "front" and "rear" are simply used for reference purposes, but are not limiting in the operational sense of the assembly. In this view, we can see that the saddles of the wheel (100a, b, cord) which is linked by the steering tie rod (102) via the pivoting pins (201a or b) which is affixed to the saddle. In one embodiment, the steering tie rod (102) is provided with holes at the distal ends of the rod such that the rod can simply be placed down on the pins as they are received into the holes, and just as easily removed.

Also in this view, we can see that the upper frame longitudinal member (left or right) extends beyond the vertical member to provide an arm (403) in which a mounting hole (504) has been formed, through which the wheel's pivoting pin (401) is received and preferably secured with a washer and lock nut.

The steering handle (203) is also in the handle receiver (202) such that it is ready to be steered and maneuvered. It is of preference that any wheels intended to be steering wheels comprise fully pivoting types of casters with bearings to support the appropriate weight of the total dolly plus the rated load, but other suitable wheels may be employed as the intended application may indicate.

For non-steering wheels, which we may refer to as "rear" wheels, the arm (403) extension of the upper frame longitudinal member has a locking pin hole (502) formed in it, in a vertically aligned position with a hole (503) formed in the wheel saddle, as well. A linchpin (501) may be removably received through the frame arm hole (502) and downwards into the saddle hole (502), thereby pinning the non-steering wheel into a "straight pointing" direction. Simply by pulling out the linchpin, the dolly can be engaged in a four-wheel free moving mode for front to back rolling, side to side rolling, and all combinations there between. Again, we are using the term "rear" simply as a reference term, whereas the dolly can be moved just as well towards the pinned wheels away from them.

As shown in this diagram, for further interchangeability and non-directionality of the design, the pinning holes may be provided on front as well as rear arms and wheel saddles, as well as steering handle receivers on all wheels. Such a configuration would allow quick assembly of all parts with little concern about proper front and rear orientation of the side rails.

Regarding the length of the cross members (front, rear, and intermediate), in one embodiment, about 6' end-to-end was sufficient to receive a 4' or 5' wide shelter. It should be noted that different lengths of cross members allow the same side rails to be configured into dollies of different widths, thereby allowing the manufacturer and the end-user a greater degree of flexibility.

Assembly, Disassembly, and Stowage

To assemble the dolly, one must merely lay the two side rails on the ground in a parallel fashion, and the clip on the cross members while the side rails are held in an upright position. If the square tube stock of the example drawings is used with the square low-slung hanger clips, then the clips themselves will place and keep the assembly in a parallelogram configuration. Then, the steering tie rod and steering handle can be attached to any wheel as is convenient for the expected usage, and the wheels on the opposite end of the dolly can be optionally pinned into straight-on orientation.

Disassembly is by the reverse of the assembly process. Stowage for convenient transportation is achieved by placing all of the cross members in parallel arrangement with the side rails, and optionally securing them with a bungee cord, and then placing them onto a truck bed for travel.

Tool free assembly and disassembly is achieved by the hanger design, and by using pins and pivots as described. Additional means of retention such as a bolts, nuts, clevis pins and cotter pins may also be employed at the various points of assembly and disassembly to provide a secondary means of securing the attachments.

Method of Use to Install a Storm Shelter

In order to use the new dolly to install a storm shelter, the dolly may be placed disassembled on the same flatbed truck with the shelter unit itself. Upon arriving at the installation site, the dolly can be quickly assembled with or without tools in some embodiments, and then the shelter is lifted off the truck and placed on the dolly outside the garage. After completing preparation of the pit, the dolly may be simply pushed and rolled through the garage threshold and into the garage, directly over and astride the pit. In this step, one can already see the safety and efficiency improvement over the traditional method. At this point, not only has a taller shelter been placed into the garage, it was done so with scraping the bottom of the shelter or damaging the floor by sliding it.

Next, the arched lift is placed above the dolly and shelter, and the shelter is lifted off the dolly. Then, the front cross member can be removed, and the dolly simply rolled out from underneath the shelter, leaving the shelter suspended over the pit.

After lowering the shelter into the pit and checking for plumb and level orientation, if rework is need in the pit, then the shelter is lifted back out, dolly rolled back under, shelter lowered onto the dolly, and the shelter is rolled away from the pit. This leaves the pit free of having the shelter hanging over it, making it safer for the crew person to enter the pit to perform the necessary rework.

After installation is complete, the dolly is simply disassembled, stowed on the truck, and it leaves with the truck ready for another installation.

Rear Push Bar or Plate, Lifting Hook, and Wheel Jacks

In some installation scenarios, there may be a break in the flatness of the surface between the approach to the garage door and the garage floor, such as when the driveway approaches at a steep incline. Because of the long wheelbase of the dolly and the low ground clearance it provides, there is a possibility of the dolly high centering as it transitions into the garage from the approach.

There a number of ways to potentially deal with this. First, it may be possible to swivel the dolly such that it approaches the garage threshold long side first, thereby presenting a shorter wheelbase (e.g. the width of the dolly instead of the length of the dolly), and lessening the possibility of high centering.

Rear Bar Lifting Hook.

A second way to potentially deal with high centering or dragging is to engage a rear push plate, if equipped, with the backhoe to lift it slightly in the rear, thereby clearing the high center point. In some installations where the approach to the garage threshold may be steeply inclined or declined, it may be desirable to use the backhoe to push the dolly loaded with the shelter. In such a case, a bar or plate which is mounted to the rear cross member may be useful in order to give the backhoe a point of contact, to avoid pushing directly on the side of the shelter and potentially damaging it.

As previously mentioned, one such embodiment option is a lifting hook (501) as shown in FIG. 3 formed on the top of each upper frame longitudinal member (302) (or on the wheel extension arm), below which the front or rear cross member is attached to the upper frame longitudinal member using a similar low-slung hanger. If, when the loaded dolly is being rolled into a garage, the bottom of the cart or of the load "high centers" or drags on the garage floor, then the backhoe may be used to carefully lift up on the rear cross member. Without the retention hooks (501), this would just lift the cross member off of the side rails, but with the retention hook, the rear cross member will lift until it contacts the bottom of the retention hook. Then, further lifting on the rear cross member will actually lift the rear set of wheels off of the ground, thereby freeing it from dragging and allowing it to be pushed forward rolling only on the front two wheels. When the rear wheels have cleared the high-centering point, it can be lowered again, and the cart can be used normally.

High Centering Jack Wheels.

Another way to resolve high centering is to provide the dolly with an optional trailer jack with a wheel, or to use wheeled trailer jacks as the rear wheels. In this manner, as the high centering situation arises, the jack can be engaged to raise the rear of the dolly as much as necessary, and then to re-lower it gradually as the shelter passes through the garage threshold.

Corner-Dolly Embodiment

Figure 5:
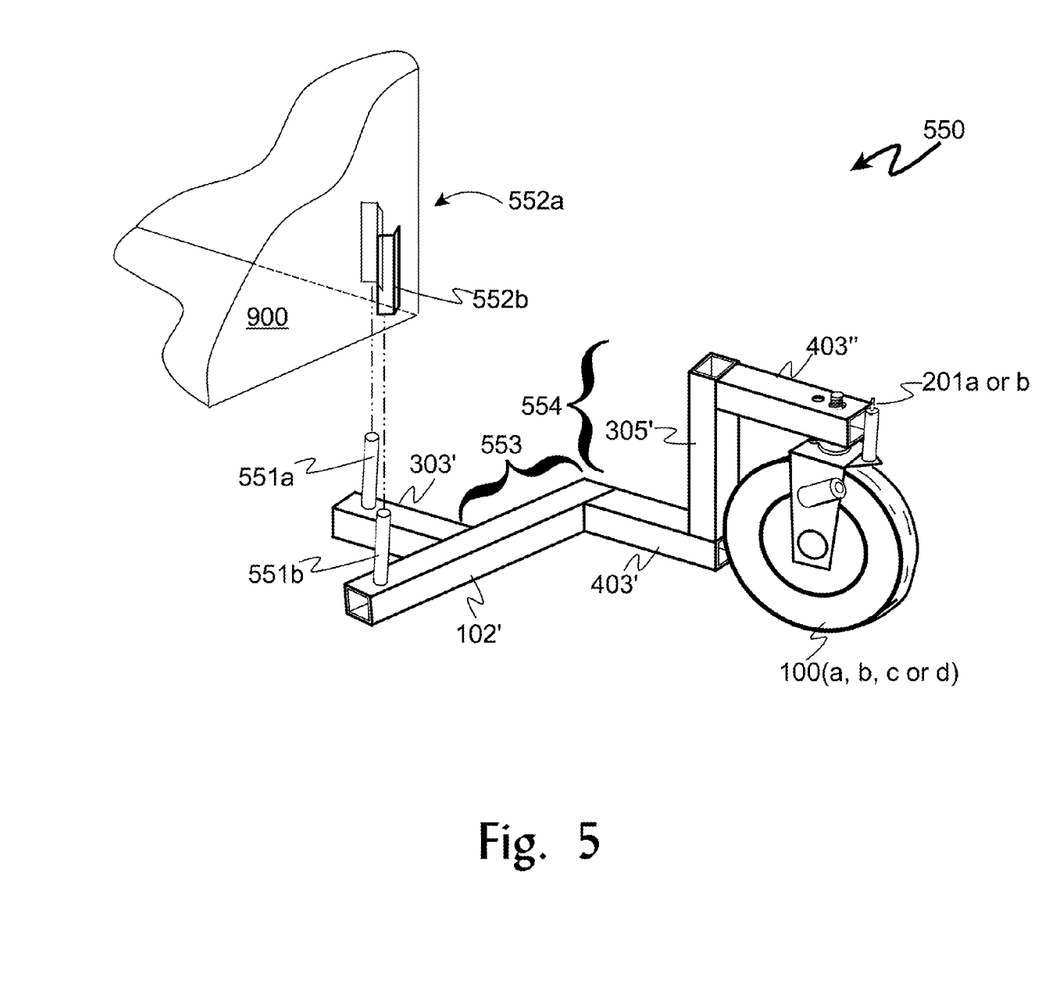
FIG. 5 illustrates another embodiment of the dolly according to the present invention.

Turning to FIG. 5, another embodiment (550) according to the present invention is shown which uses the structure of the load itself, e.g. a pre-fabricated storm shelter, as a portion of the side rails and the cross members. In this embodiment, the corners of the shelter (900) are provided with one or more receivers (552a, 552b), such as sections of angle iron welded to the corners of the walls of the shelter as shown, or such as segment of pipe, tubing or even hook loops. These are placed in spacing to receive two attachment pints (551a, 552b), which are atop modified and shortened cross member (102'), placed in a low-slug arrangement with shortened side rail lower member (303'), relocated vertical member (305') and relocated wheel arm components (403', 403").

In this arrangement, there are no lengthy side rails to transport, only smaller and more compact corner wheel dollies, but the load is be modified to temporarily attach to the corner wheel dollies. The members (102', 403', 305' and 403") are arranged with lengths which still produce a low draft (554) dolly having side-to-side clearance (553) suitable for straddling the open pit for installation as disclosed in the foregoing paragraphs. It will be appreciated by those skilled in the art that the members (102', 403', 305' and 403") may be combined and reshaped in many different ways to product the low draft (554) and straddle clearance (553) within the spirit and scope of the present invention.

Front-Rear Dolly Embodiment

Another embodiment available within the scope of the present invention is a configuration which eliminates the lengthy side rails, and produces two half-dollies which extend across the front or across the rear of the load. In such an arrangement, the front dolly (front two wheels with cross members and steering mechanisms) and the rear dolly (rear two wheels with cross members) would be mechanically attached to each other via the suspended load therebetween.

Three-Wheeled Embodiment

Yet another embodiment of the present invention is a variation on the foregoing embodiments in which the two rear wheels are replaced by a single rear wheel, such that the two front wheels straddle the pit, but the rear wheel is sufficiently far enough behind or away from the rear of the storm shelter to prevent it from rolling over the edge of the pit. In such a configuration, the rear wheel may be pivoting in order to steer the loaded dolly, and the front wheels can be optionally locked in a forward-pointing direction or also pivoting to allow for movement in any direction.

Alternative Materials and Construction Methods

Other embodiments may use other materials and different construction configurations within the scope of the present invention. For example, instead of using square tubing stock to create the side rails, cross members, and clips, round tubing stock or even L- or U-shaped stock may be use. And, some or all of the features described to provide tool free assembly may be eliminated to yield a permanently assembled version of the dolly, or to yield a dolly which requires tools to assemble and disassemble.

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process(es).

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A shallow-draft transportable dolly for moving a pre-fabricated storm shelter through a threshold having a threshold height, wherein the pre-fabricated load has a height approximate to the threshold height, the dolly comprising:
   at least one rear wheel;
   at least one rear wheel attachment structure having a mechanical reception for a rear portion of a pre-fabricated storm shelter;
   two front wheels, each having an axle and each being attached to a wheel arm; and
   two front corner structures, each being attached to a wheel arm, and each having mechanical reception for a front corner of the pre-fabricated storm shelter;
   wherein, upon reception of the pre-fabricated storm shelter by the at least one rear wheel attachment structure and the two front corner structures, the pre-fabricated storm shelter is carried by the wheels, such that the front wheels extend beyond a width of the pre-fabricated storm shelter for straddling an open pit, and such that a bottom surface of the pre-fabricated storm shelter is positioned at or below a level of the axles and above a bottom of the wheels, thereby allowing the pre-fabricated storm shelter to be rolled on the wheels over the open pit with the wheels astride the open pit, removal of corner structures following suspension of the pre-fabricated storm shelter, thereby leaving the pre-fabricated storm shelter suspended over the open pit.

2. The shallow-draft transportable dolly as set forth in claim 1 wherein the mechanical reception comprises a mechanical receiver selected from the group consisting of a vertical pin for receipt into a hanger tube, a horizontal member for insertion into a receiver, and a hook for engaging a loop.

3. The shallow-draft transportable dolly as set forth in claim 1 wherein the corner structures further comprise:
two side rail units, each having a front and a rear end, each having a lower longitudinal member and an upper longitudinal member above the lower longitudinal member, wherein the wheel arms each extend from the front and rear ends of the side rail units approximately in horizontal alignment with the upper longitudinal members;
a front cross member disposed between the front ends of the side rail units; and
a rear cross member disposed between the rear ends of the side rail units;
wherein the mechanical reception comprises a plurality of intermediate cross members disposed transversally between the lower longitudinal members of the two side rail units, thereby providing a slatted load receiving bed on top surfaces of the intermediate cross members; and
wherein the slatted load receiving bed is positioned at or below said axles, and wherein at least the front cross member is removable such that the pre-fabricated storm shelter may be moved over the open pit with the wheels astride the open pit, the pre-fabricated storm shelter lifted from the slatted load receiving bed, the front cross member removed, and the dolly rolled from underneath the pre-fabricated storm shelter thereby leaving the pre-fabricated storm shelter suspended over the open pit.

4. The shallow-draft transportable dolly as set forth in claim 3 wherein the intermediate cross members are removably attached to the lower longitudinal members.

5. The shallow-draft transportable dolly as set forth in claim 4 wherein the removable attachment comprises a hanger device.

6. The shallow-draft transportable dolly as set forth in claim 1 wherein at least the pivotally attached two wheels further comprise a steering tie rod, two pivots and a steering handle for pivoting the pivotally attached wheels in a manner parallel to each other.

7. The shallow-draft transportable dolly as set forth in claim 1 wherein at least the pivotally attached two wheels further comprise a void formed in a saddle portion for receiving a locking pin, wherein the locking pin maintains a wheel position substantially parallel to a side rail unit.

8. The shallow-draft transportable dolly as set forth in claim 1 further comprising at least one anti-high-centering mechanism selected from the group consisting of a push bar, a push plate, a lifting hook, and a wheel jack.

9. A method of installing a below-ground pre-fabricated storm shelter having a substantially rectangular bottom portion with four corners, the method comprising the steps of:
attaching to a pre-fabricated storm shelter one or more dolly components comprising three or more wheels, one wheel proximately located to two front corners of the storm shelter extending beyond a width of the storm shelter for straddling an open pit, wherein at least one of the wheels is pivotally mounted to the one or more dolly components, and such that a bottom surface of the pre-fabricated storm shelter is positioned at or below a level of the axles and above a bottom of the wheels, thus allowing carriage of the pre-fabricated storm shelter in a low-draft position;
rolling and maneuvering the storm shelter borne by the one or more dolly components over the open pit with the wheels astride the open pit; and
detaching the one or more dolly components following suspension of the pre-fabricated storm shelter by a lift or hoist, thereby leaving the pre-fabricated storm shelter suspended over the open pit with the dolly components away from interference with lowering of the pre-fabricated storm shelter into the open pit.

10. The method of installing as set forth in claim 9 wherein the attaching comprises engaging a mechanical receiver selected from the group consisting of a vertical pin for receipt into a hanger tube, a horizontal member for insertion into a receiver, and a hook for engaging a loop.

11. The method of installing as set forth in claim 9 wherein attaching one or more dolly components comprises:
assembling in a parallel arrangement two side rail units, each having a front and a rear end, each having a lower longitudinal member and an upper longitudinal member above the lower longitudinal member, wherein the four wheel arms each extend from the front and rear ends of the side rail units approximately in horizontal alignment with the upper longitudinal members;
disposing a front cross member between the front ends of the side rail units; and
disposing a rear cross member between the rear ends of the side rail units;
disposing a plurality of intermediate cross members transversally between the lower longitudinal members of the two side rail units, thereby providing a slatted load receiving bed on top surfaces of the intermediate cross members; and
wherein the slatted load receiving bed is positioned at or below said axles, and wherein at least the front cross member is removable for said detachment.

12. The method of installing as set forth in claim 9 further comprising disposing a steering tie rod between the at least two pivotally-mounted wheels to provide for steering of the one or more dolly components.

* * * * *